United States Patent
Prakash et al.

(10) Patent No.: US 8,838,132 B2
(45) Date of Patent: Sep. 16, 2014

(54) ENHANCED POSITIONING ASSISTANCE DATA FOR REDUCED SIGNALING

(75) Inventors: Rajat Prakash, La Jolla, CA (US); Nathan E. Tenny, Poway, CA (US); Parag A. Agashe, San Diego, CA (US); Stephen W. Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 12/854,790

(22) Filed: Aug. 11, 2010

(65) Prior Publication Data
US 2011/0039576 A1     Feb. 17, 2011

Related U.S. Application Data

(60) Provisional application No. 61/233,415, filed on Aug. 12, 2009.

(51) Int. Cl.
| | |
|---|---|
| H04W 24/00 | (2009.01) |
| H04W 64/00 | (2009.01) |
| G01S 5/02 | (2010.01) |
| G01S 19/03 | (2010.01) |
| G01S 19/14 | (2010.01) |
| H04L 29/08 | (2006.01) |
| H04W 4/02 | (2009.01) |

(52) U.S. Cl.
CPC ............ *H04W 64/00* (2013.01); *G01S 19/14* (2013.01); *H04L 29/08657* (2013.01); *H04W 4/02* (2013.01); *G01S 5/0236* (2013.01); *G01S 19/03* (2013.01)
USPC ..................................... 455/456.1; 455/456.6

(58) Field of Classification Search
CPC .. H04W 64/00; H04W 4/02; H04L 29/08657; G01S 19/14; G01S 5/02
USPC .............. 455/422.1, 432.1, 456.1–457, 455/403–404.1
See application file for complete search history.

(56) References Cited

U.S. PATENT DOCUMENTS

| | | |
|---|---|---|
| 6,861,980 B1 | 3/2005 | Rowitch et al. |
| 7,009,948 B1 | 3/2006 | Carlsson et al. |

(Continued)

FOREIGN PATENT DOCUMENTS

| | | |
|---|---|---|
| CN | 1695322 A | 11/2005 |
| JP | 200174826 | 3/2001 |

(Continued)

OTHER PUBLICATIONS

Martin-Escalona et al., "Delivery of Non-Standardized Assistance Data in EOTD/GNSS Hybrid Location Systems", 13th IEEE International Symposium on Personal, Indoor and Mobile Radio Communications, Dec. 10, 2002.

(Continued)

*Primary Examiner* — Ajit Patel

(57) ABSTRACT

Apparatus and methods for determining a location estimate of a mobile device based on an extended set of assistance data are presented. The extended assistance data includes assistance data for base stations, such as cellular base stations and access points, not expected to be viewable by the mobile device in a (current) first geographical area but expected to be viewable by the mobile device in a (future) second geographical area. By seeding the mobile device with assistance data expected to be useful in the future, the network reduces messaging between the network and mobile device and battery consumption by the mobile device.

36 Claims, 9 Drawing Sheets

(56) References Cited

U.S. PATENT DOCUMENTS

| | | |
|---|---|---|
| 2002/0111171 A1 | 8/2002 | Boesch et al. |
| 2003/0040331 A1 | 2/2003 | Zhao |
| 2006/0240841 A1 | 10/2006 | Bhattacharya |
| 2007/0270163 A1* | 11/2007 | Anupam et al. ........... 455/456.1 |
| 2007/0275734 A1 | 11/2007 | Gaal et al. |
| 2008/0032706 A1 | 2/2008 | Sheynblat et al. |
| 2008/0227465 A1 | 9/2008 | Wachter et al. |
| 2009/0009397 A1 | 1/2009 | Taylor et al. |
| 2009/0146872 A1 | 6/2009 | Harper et al. |
| 2010/0062790 A1* | 3/2010 | Wigren ...................... 455/456.1 |
| 2010/0178932 A1* | 7/2010 | Hansson ................... 455/456.1 |

FOREIGN PATENT DOCUMENTS

| | | |
|---|---|---|
| JP | 2002522793 A | 7/2002 |
| JP | 2007043391 A | 2/2007 |
| TW | 200618655 | 6/2006 |
| TW | 200819774 A | 5/2008 |
| TW | 200843537 A | 11/2008 |
| TW | 200914861 A | 4/2009 |
| WO | 0010028 A1 | 2/2000 |
| WO | WO2004031794 | 4/2004 |
| WO | WO2006117198 | 11/2006 |
| WO | 2009086278 A1 | 7/2009 |

OTHER PUBLICATIONS

International Search Report and Written Opinion—PCT/US2010/045326, International Search Authority—European Patent Office—Nov. 5, 2010.

Taiwan Search Report—TW099126975—TIPO—Jul. 22, 2013.

* cited by examiner

Assistance data for current (first) geographical area (e.g., longitude/latitude of locally accessible base station transmitters)
100A FIG. 4
(Prior Art)

Extended assistance data
200

First subset of assistance data accessible from a current (first) geographical area (e.g., longitude/latitude of locally accessible base station transmitters)
100

Second subset of assistance data accessible from a next (second) geographical area but inaccessible from the first geographical area (e.g., longitude/latitude of remote, inaccessible base station transmitters)
110

FIG. 5

Extended assistance data
200

First subset of assistance data accessible from a (current) first geographical area
100

Base Station Almanac
Listing of base stations in a first geographical area. For each base station:
- Type of base station node (e.g., CDMA2000, node B (UMTS), eNode B (LTE) or Access Points (Wi-Fi))
- ID of nodes
- Longitude of node
- Latitude of node
- Transmission timing (e.g., relative to one or more neighboring base stations)
- Transmission power
- GPS or GNSS timing relationship to base station transmission timing

105

(Extended) second subset of assistance data accessible from a (next) second geographical area but inaccessible from the first geographical area
110

Base Station Almanac
115

GNSS assistance data
120

FIG. 9

ENHANCED POSITIONING ASSISTANCE DATA FOR REDUCED SIGNALING

CROSS-REFERENCE TO RELATED APPLICATIONS

This application claims the benefit of and priority to U.S. Provisional Application No. 61/233,415 filed Aug. 12, 2009, titled "ENHANCED POSITIONING ASSISTANCE DATA FOR WIRELESS DEVICE POSITIONING" and which is expressly incorporated herein by reference.

BACKGROUND

I. Field of the Invention

This disclosure relates generally to apparatus and methods for estimating a position. More particularly, the disclosure relates to extended assistance data used in taking measurements at a current geographical area (or first geographical area) and a future geographical area (or second geographical area).

II. Background

Today, a mobile device may determine a location estimate based on signals it receives from base stations and/or global positioning satellites. To assist a mobile device in determining which signals to seek, a network may provide the mobile device with an assistance data message containing assistance information. This assistance information may be localized to a particular area. The mobile device may use the provided assistance data when in that particular area. When the mobile device moves from a first geographical area to a new geographical area, the mobile device may request and receive new assistance data for the new geographical area. Each time the mobile device needs new assistance data because the previously received assistance data is inapplicable or unusable in a new geographical area, the mobile device exchanges messages with the network. This exchange of additional messages increases message traffic in a wireless communications system leaving less bandwidth for other traffic, delays initiation of finding a first fix when in a new geographical area, and leads to additional power consumption from transmitting and receiving additional messages between the mobile device and the network, each of which contribute to battery consumption on the mobile device. Therefore, a method and apparatus is desired to reduce message traffic, increase a time to first fix and decrease battery power consumption.

SUMMARY OF THE DISCLOSURE

Disclosed is an apparatus and method for determining a location estimate of a mobile device, the method comprising: receiving assistance data at a first geographical area, wherein the assistance data comprises assistance data accessible from a second geographical area but inaccessible from the first geographical area; saving the assistance data; moving from the first geographical area to the second geographical area; and obtaining location information in the second geographical area using the assistance data.

Some embodiments provide for a method for determining a location estimate of a mobile device, the method comprising: receiving extended assistance data, while in a first geographical area, wherein the extended assistance data comprises assistance data applicable in a second geographical area and inapplicable in the first geographical area; saving the extended assistance data to memory; moving from the first geographical area to the second geographical area; obtaining location information, while in the second geographical area, using the assistance data applicable in the second geographical area; and providing the location information to determine the location estimate of the mobile device.

Some embodiments provide for a mobile device for determining a location estimate of the mobile device, the mobile device comprising a base station receiver, a base station transmitter, a processor and a memory comprising code to: receive extended assistance data, while in a first geographical area, wherein the extended assistance data comprises assistance data applicable in a second geographical area and inapplicable in the first geographical area; save the extended assistance data to memory; obtain location information, while in the second geographical area, using the assistance data applicable in the second geographical area; and provide the location information to determine the location estimate of the mobile device.

Some embodiments provide for a mobile device for determining a location estimate of the mobile device, the mobile device comprising: means for receiving extended assistance data, while in a first geographical area, wherein the extended assistance data comprises assistance data applicable in a second geographical area and inapplicable in the first geographical area; means for saving the extended assistance data to memory; means for obtaining location information, while in the second geographical area, using the assistance data applicable in the second geographical area; and means for providing the location information to determine the location estimate of the mobile device.

Some embodiments provide for a mobile device for determining a location estimate of the mobile device, the mobile device comprising a processor and memory wherein the memory includes instructions to: receive extended assistance data, while in a first geographical area, wherein the extended assistance data comprises assistance data applicable in a second geographical area and inapplicable in the first geographical area; save the extended assistance data to memory; obtain location information, while in the second geographical area, using the assistance data applicable in the second geographical area; and provide the location information to determine the location estimate of the mobile device.

Some embodiments provide for a computer-readable storage medium comprising program code stored thereon for a mobile device for determining a location estimate of the mobile device, the program code including program code to: receive extended assistance data, while in a first geographical area, wherein the extended assistance data comprises assistance data applicable in a second geographical area and inapplicable in the first geographical area; save the extended assistance data to memory; obtain location information, while in the second geographical area, using the assistance data applicable in the second geographical area; and provide the location information to determine the location estimate of the mobile device.

Some embodiments provide for a method of preparing extended assistance data, by a network, for a mobile device in a first geographical area, the method comprising: determining base stations to identify thereby defining a second geographical area; preparing the extended assistance data, wherein the extended assistance data comprises assistance data applicable in the second geographical area and known inapplicable in the first geographical area; and sending the extended assistance data to the mobile device while the mobile device is in a first geographical area.

Some embodiments provide for a network entity for preparing extended assistance data for a mobile device in a first geographical area, the network entity comprising: means for determining base stations to identify thereby defining a second geographical area; means for preparing the extended assistance data, wherein the extended assistance data comprises assistance data applicable in the second geographical area and known inapplicable in the first geographical area; and means for sending the extended assistance data to the mobile device while the mobile device is in a first geographical area.

Some embodiments provide for a network entity for preparing extended assistance data for a mobile device in a first geographical area, the network entity comprising a processor and memory comprising code to: determine base stations to identify, for the mobile device in a first geographical area, thereby defining a second geographical area; prepare the extended assistance data, wherein the extended assistance data comprises assistance data applicable in the second geographical area and known inapplicable in the first geographical area; and send the extended assistance data to the mobile device while the mobile device is in a first geographical area.

Some embodiments provide for a computer-readable storage medium comprising program code stored thereon for a network entity for determining a location estimate of the mobile device, the program code including program code to: determine base stations to identify, for the mobile device in a first geographical area, thereby defining a second geographical area; prepare the extended assistance data, wherein the extended assistance data comprises assistance data applicable in the second geographical area and known inapplicable in the first geographical area; and send the extended assistance data to the mobile device while the mobile device is in a first geographical area.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

FIG. 4 shows assistance data contained in an assistance data message.

FIG. 5 shows assistance data contained in an assistance data message.

FIG. 9 shows extended assistance data contained in an assistance data message.

DETAILED DESCRIPTION

Figure 1:
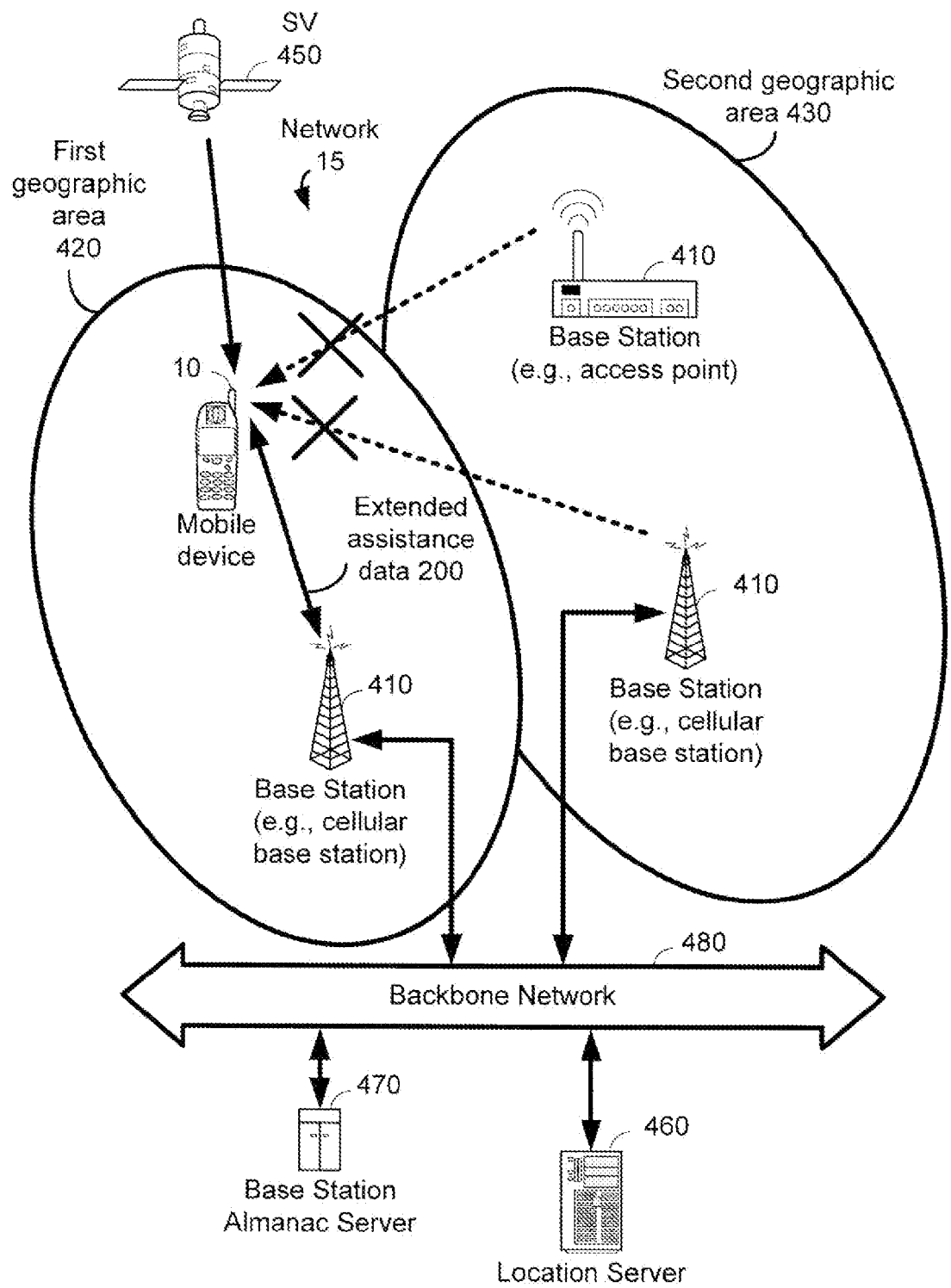
FIG. 1 illustrates a communication system.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination techniques described herein may be implemented in conjunction with various wireless communication networks such as a wireless wide area network (WWAN), a wireless local area network (WLAN), a wireless personal area network (WPAN), and so on. The terms "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile device, sometimes referred to as a mobile station (MS) or user equipment (UE), includes devices such as a cellular phone, mobile phone or other wireless communication device, personal communication system (PCS) device, personal navigation device (PND), Personal Information Manager (PIM). Personal Digital Assistant (PDA), laptop or other suitable mobile device which is capable of receiving wireless communication and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile device."

In accordance with aspects of the present invention, a number of assistance data transactions may be reduced; thereby lowering power consumption, if individual assistance data transactions include data applicable to more than an immediate geographical area. That is, an extended assistance data message includes data valid for a wider geographical area, where the wider geographical area includes both an original, immediate or current geographical area (referred to below as a first geographical area 420) and a predicted, future, new, different or next geographical area (referred to below as a second geographical area 430). Future transactions are no longer necessary after the mobile device moves outside the first geographical area 420. For example, the network may send to the mobile device extended assistance data that is valid in a region beyond the mobile device's current position or first geographical area 420. This first geographical area 420 may be defined in several ways. For example, the first geographical area 420 may refer to the coverage area of a serving base station. Alternatively, the first geographical area 420 may refer to the geographical area containing all base stations whose signals can be received and measured by a mobile device. In some embodiments, the first geographical area 420 is smaller than the second geographical area 430, but both the first geographical area 420 and the second geographical area 430 may be restricted by the distance over which a signal may be received and measured or decoded by a receiver of the mobile device. In some embodiments, the first geographical area 420 and the second geographical area 430 are limited to a few square miles (or a few square kilometers) (e.g., the first geographical area 420 and the second geographical area 430 are each limited to 10 square miles). As used below, a cell may refer to the coverage area of a single serving base station. Also, as used below, a base station, such as a cellular base station or an access point, may be referred to as a cell.

FIG. 1 illustrates a communication system. The communication system shows a mobile device 10 and a network 15. The network 15 includes a base station 410 in a first geographical area 420 and a base stations 410 in a second geographical area 430. The communication system may also include one or more GPS or GNSS SVs 450. The mobile device 10 may receive signals from the one or more GPS or GNSS SVs 450.

The first geographical area 420 encompasses the mobile device 10 and includes one or more base stations 410 from which the mobile device 10 can (or should be able to) receive a signal. The mobile device 10 may communicate with at least one base station 410 in the first geographical area 420 to receive extended assistance data 200 and may communicate with one or more base stations 410 in the first geographical area 420 to receive signals that may be used for computing a location estimate of the mobile device 10. As described below, extended assistance data 200 may be sent from the network 15 and received by the mobile device 10. The extended assistance data 200 may include a first subset 100 (FIG. 5) (a list of base stations 410 in the first geographical area 420) and includes a second subset 110 (FIG. 5) (a list of base stations 410 in the second geographical area 430). The mobile device 10 cannot (or likely cannot) communicate with the base stations 410 in the second geographical area 430 at least while in its current position within the first geographical area 420. In sum, the mobile device 10 receives extended assistance data 200 from the network 15, while the mobile device 10 is in the first geographical area 420, where the extended assistance data 200 includes the second subset 110 of assistance data applicable in the second geographical area 430 and inapplicable in the first geographical area 420. The second subset 110 of assistance data may be known (or equivalently, likely) inapplicable in the first geographical area 420.

The network 15 may also include one or more location servers 460 and one or more base station almanac servers 470, which both communicate through a backbone network 480 and/or other network entities. In some embodiments, a base station almanac server 470 may be integrated into a location server 460. The location server 460 may comply with one of several known industry standards or protocols, such as: (a) Secure User Plane Location (SUPL), a location solution defined by the Open Mobile Alliance (OMA); (b) SUPL Location Platform (SLP), a type of location server; (c) Serving Mobile Location Center (SMLC), an entity defined by 3GPP for location use with GSM or UMTS; (d) Evolved SMLC (E-SMLC), used for location with LTE; and (e) Position Determining Entity (PDE), used for location by cdma2000 networks. The location server 460 may perform many or all of the functions referred to below as attributed to a network 15.

Figure 2:
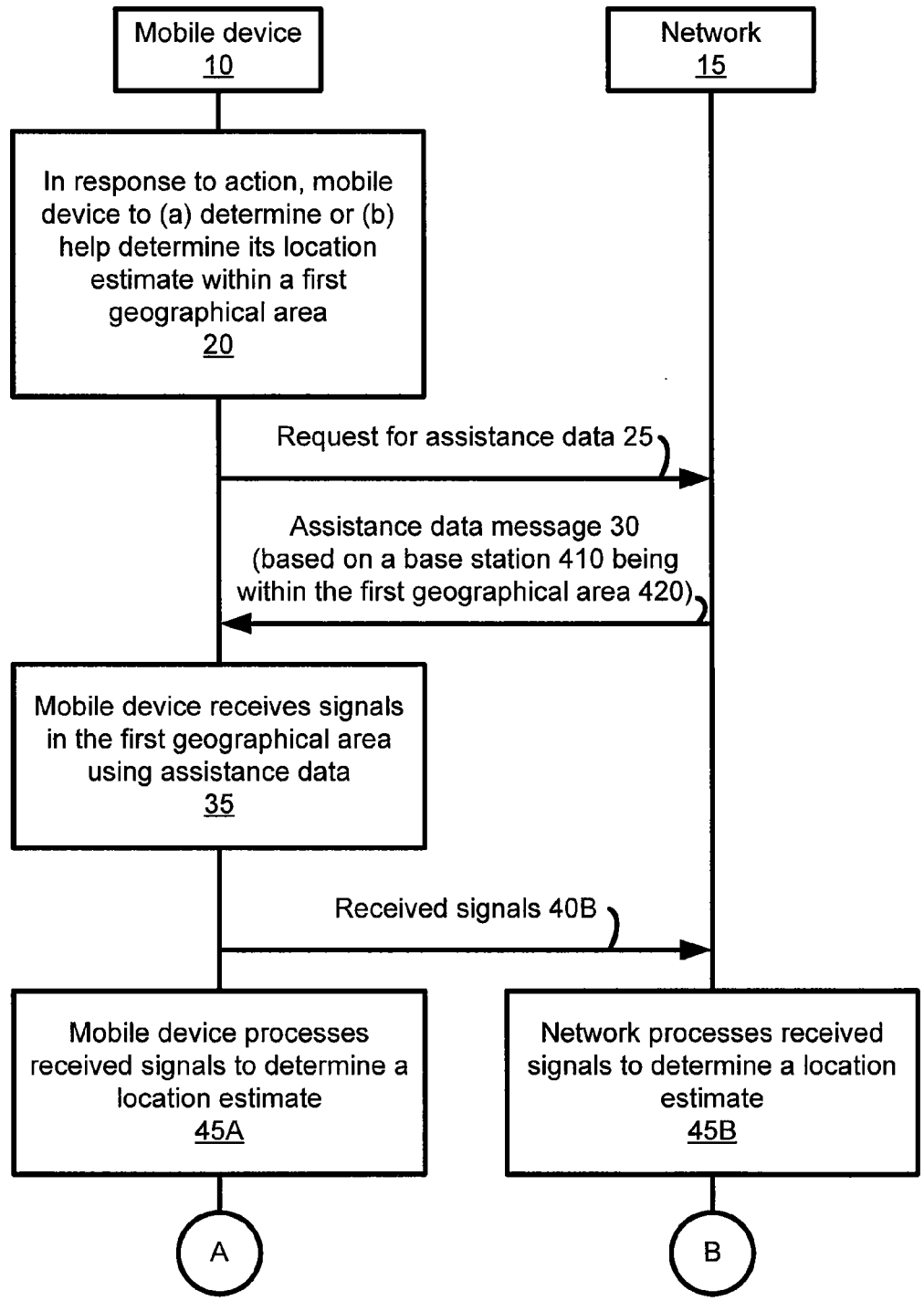
FIGS. 2 and 3 show communication between a mobile device and a network to determine a first location estimate at a first geographical area and determine a second location estimate at a second geographical area.
Figure 3:
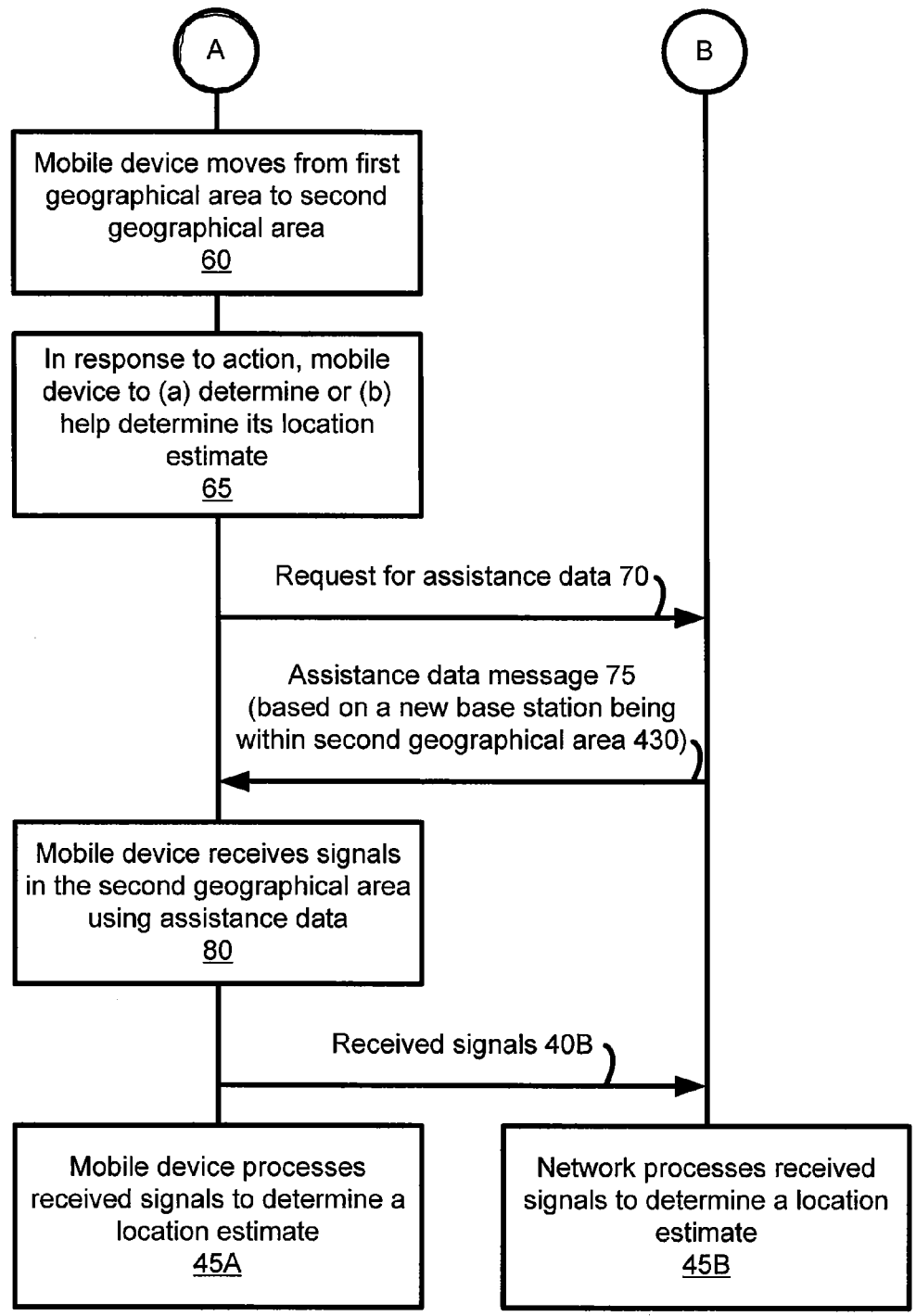

FIGS. 2 and 3 show communication between a mobile device 10 and a network 15 to determine a first location estimate at a first geographical area 420 and determine a second location estimate at a second geographical area 430.

In FIG. 2 at 20, the mobile device 10 initiates a process within the mobile device 10 to determine, or help determine, its location estimate at within a first geographical area 420. This process may be initiated in response to an action from the user of the mobile device 10, an action within the mobile device 10 (e.g., a timer expiration or a request from an application within the mobile device 10), or an action external to the mobile device 10 (e.g., a request for estimated position of the mobile device 10 from the network 15). The mobile device 10 may process signals or perform calculations necessary to determine its location estimate. Alternatively, the mobile device 10 may assist the network 15 in determining the location estimate of the mobile device 10.

An assistance data request 25 is sent by the mobile device 10 and received by the network 15. In some embodiments, the assistance data request 25 is part of another mobile-to-network message. In other embodiments, the mobile device 10 does not send an assistance data request 25 because it already has the necessary assistance data. For example, the network 15 may have previously provided the mobile device 10 with the requested assistance data in an earlier point-to-point message or in a broadcast message.

An assistance data response 30 is sent by the network 15 and received by the mobile device 10. The assistance data response 30 contains the requested assistance data for a first geographical area 420. The first geographical area 420 may be based on a position within the network 15 of a base station 410 that the mobile device 10 is communicating with. At 35, the mobile device 10 uses the assistance data for the first geographical area 420 to receive signals from identified nearby base stations 410.

As described above, the mobile device 10 or the network 15 may determine a location estimate of the mobile device 10. At 45A, if the mobile device 10 determines its location estimate, the mobile device 10 processes the received signals. Alternatively, the mobile device 10 assists the network 15 by sending a message 40B containing the received signals. At 45B, the network 15 then processes the received signals to determine a location estimate of the mobile device 10.

The process continues on FIG. 3. At 60, in this example, the mobile device 10 moves from the first geographical area 420 to a (new) second geographical area 430. If the mobile device 10 moved from the first geographical area 420 to second geographical area 430 before processing was complete at step 35 or at step 45A, then assistance data is no longer useable because the assistance data message 30 described above contains assistance data necessary for the first geographical area 420 but does not contain assistance data necessary for the second geographical area 430. Therefore, the mobile device 10 can no longer use the assistance data (received at step 30) while in the new second geographical area 430. In this case, the mobile device 10 will need to repeat the steps of requesting assistance data (step 25) and receiving assistance data (step 30) as described below with reference to steps messages 70 and 75.

At 65, the mobile device 10 again initiates the process described above to determine, or help determine, its location estimate at within the second geographical area 430. An assistance data request 70 is sent by the mobile device 10 and received by the network 15. An assistance data response 75 is sent by the network 15 and received by the mobile device 10. The assistance data response 75 now contains assistance data for the second geographical area 430. The second geographical area 430 may be based on a new position within the network 15 of a new base station 410 (e.g., the second geographical area 430 may be defined by the coverage area of the new base station 410, by the coverage area of the new base station 410 and its immediate neighbors, or by the coverage area of the new base station 410, its immediate neighbors and the neighbors of the immediate neighbors).

At 80, the mobile device 10 uses the assistance data for the second geographical area 430 to receive signals from identified nearby base stations 410. These base stations 410 of the second geographical area 430 may be different to the base stations 410 whose signals were received from the first geographical area 420, described above at step 35.

Once the mobile device 10 receives the signals at step 80, the received signals may be used to determine a location estimate of the mobile device 10. The procedures described above where the mobile device 10 determines the location estimate (with reference to numeral 45A) or alternatively where the network 15 determines the location estimate (with reference to numerals 40B and 45B) may be executed again with the received signals from step 80. That is, at 45A following step 80, the mobile device 10 determines its location estimate by processing the received signals. Alternatively and also following step 80, the mobile device 10 may assist the network 15 by sending a message 40B containing the received signals and at 45B, the network 15 processes the received signals to determine a location estimate of the mobile device 10.

FIG. 4 shows assistance data 100A contained in an assistance data message 35. The assistance data 100A is relevant for the (current) first geographical area 420 but not relevant for the (new) second geographical area 430. The assistance data 100A may contain information about transmitters transmitting signals potentially receivable by the mobile device 10 when in the first geographical area 420. The transmitters may be satellite transmitters (e.g., in a GPS satellite) and/or terrestrial transmitters (such as a base station 410, which, e.g., may be a cellular base station, an access point, a femtocell, etc.). A terrestrial transmitter may be a single transmitter transmitting a signal for an entire cell or coverage area of a base station 410. A terrestrial transmitter may be a transmitter transmitting a single sector of a sectorized base station. A terrestrial transmitter may be a group of two, three or more co-located transmitters each transmitting a signal in a corresponding sector of a base station 410.

The assistance data 100A contains information relevant to transmitters transmitting signals likely receivable by the mobile device 10 when in the first geographical area 420. That is, the transmitters are selected based on being within or having signals receivable within the first geographical area 420. For satellite transmitters, the information may contain satellite almanac and ephemeris data for one or more satellites likely in view by a mobile device 10 in the first geographical area 420. It may also contain one or more of: (i) information that may help the mobile device 10 acquire and measure satellite signals such as expected Doppler frequency shift and expected code phase shift for each SV; (ii) GPS or GNSS timing information as related to the transmission timing of one or more base stations 410 whose signals can be received by the mobile device 10; and (iii) information to help correct satellite measurements such as ionospheric and tropospheric delays. Some of this satellite related information (e.g., GPS or GNSS timing information relative to nearby base stations 410 and expected code phase shifts) may be specific to the (current) first geographical area 420 of the mobile device 10 and not be valid in a (different) second geographical area 430. For terrestrial transmitters, the assistance data 100A may include information from a base station almanac regarding the one or more base stations 410 transmitting a signal likely receivable by a mobile device 10 in the first geographical area 420. For example, assistance data 100A may contain just terrestrial assistance data, for example, a location of just the base station 410 transmitting the assistance data 100A. Alternatively, the assistance data 100A may contain terrestrial assistance data information for several base stations 410 with signals likely receivable from the first geographical area 420. For example, for each base station 410, the assistance data 100A may contain a base station identifier (e.g., a MAC address, a cell tower identifier and/or a global network address) and the location (e.g., latitude and longitude) of the base station 410. Additionally, the assistance data 100A may contain one or more of the following fields: elevation, coverage area, transmission power, antenna gain, wireless network identifier, identification of neighbors, transmission timing relative to each neighbor transmission timing, and/or other characterization or capabilities of the base station 410.

The assistance data 100A may be used by the mobile device 10 to enable measurements of GPS or GNSS satellites or base stations 410 in the network 15 in support of one or more position methods that define the measurements and how they may be obtained and used to determine the location of the mobile device 10. One such position method that has been defined by 3GPP and 3GPP2 is known as Assisted GPS (A-GPS) and uses pseudorange measurements of typically 4 or more GPS SVs to determine a location estimate of the mobile device 10. In this case, A-GPS assistance data comprises information to assist the mobile device 10 to acquire and measure OPS SV signals and other information that can be used to obtain a location estimate after such measurements have been obtained. A related position method known as Assisted GNSS (A-GNSS) that has been defined by 3GPP and 3GPP2 is similar to A-GPS but provides A-GPS assistance data to measure the signals from any GNSS including but not limited to GPS. A third position method defined by 3GPP known as Observed Time Difference of Arrival (OTDOA) uses measurements of the Positioning Reference Signal (PRS) transmitted by base stations 410 (known as eNode Bs) in an LTE network. OTDOA is a terrestrial position method and the assistance data 100A it uses may include the PRS transmission characteristics and the locations of the base stations 410 (e.g., eNode Bs) and the absolute transmission timing differences between the PRS signals from neighboring base station 410 (e.g., neighboring eNode Bs). Many equivalent terrestrial position methods, similar to OTDOA, exist for other types of network. These related position methods include: Advanced Forward Link Trilateration (AFLT), which is defined by 3GPP2 for CDMA200 networks; a variant of OTDOA, which is defined by 3GPP for WCDMA networks; and Enhanced Observed Time Different (E-OTD), which is defined by 3GPP for GSM networks. The assistance data 100A for OTDOA and the other position methods similar to OTDOA is related to one or more base stations 410 and is sometimes referred to as base station almanac data.

FIG. 5 shows extended assistance data 200 contained in an assistance data message 30. To avoid repeating requesting and receiving assistance data 100A (steps 70 and 75 above), embodiments of the present invention provide for extended assistance data 200. The extended assistance data 200 may include two subsets of assistance data 100A. The extended assistance data 200, sent from the network 15 to the mobile device 10, may appear as separate first and second subsets 100, 110 (as shown) or as an interleaved union of the first and second subsets 100, 110.

A first subset 100 of assistance data, described in FIG. 4 as assistance data 100A, is valid in a (current) first geographical area 420 and includes information about transmitters having signals that are likely to be currently visible to the mobile device 10 in the first geographical area 420. The extended assistance data 200 includes a second subset 110 of assistance data valid in a (future) second geographical area 430, which is unlikely to be currently visible to the mobile device 10 but may become visible to the mobile device 10 if it moves to the second geographical area 430. In some situations, not all of the second subset 110 of assistance data in the extended assistance data 200 may be visible to the mobile device 10 in the second geographical area 430 at the same time and at the same location. That is, different portions of the extended assistance data 200 may become visible to and applicable or usable by the mobile device 10 at different locations (and thus at different times) within the second geographical area 430.

The first subset 100 of assistance data may include information described with reference to FIG. 4. Unlike the first subset 100 of assistance data, the second subset 110 of assistance data includes information regarding transmitters the mobile device 10 is not expected to be currently viewable but is expected to be able to view from a future location (i.e., the second geographical area 430). In some embodiments, the extended assistance data 200 contains only terrestrial assistance data (first subset 100 and second subset 110, or the second subset 110 without the first subset 100). In other embodiments, the extended assistance data 200 contains terrestrial assistance data and also satellite assistance data. For example, the satellite assistance data may contain data that is location specific, such as: (i) satellite timing relative to a specific base station 410 (e.g., a base station 410 in the second geographical area 430); and/or (ii) data concerning an expected code phase shift for each satellite. In some embodiments, the extended assistance data 200 contains terrestrial assistance data and satellite assistance data, wherein both the terrestrial assistance data and the satellite assistance data is dependent of being in the first geographical area 420 or the second geographical area 430.

Transmitter information included in the second subset 110 may be determined in a number of ways. The second subset 110 of assistance data may include neighbors of neighbors not included in the first subset 100. The second subset 110 of assistance data may include base stations 410 in the direction of the velocity or expected path of travel of the mobile device 10. The second subset 110 may include base stations 410 based on a mobile device 10 requesting out-of-range assistance data. The network 15 may include base station information base on a recent pattern of location estimates and/or serving base stations 410 for the mobile device 10.

Figure 6:
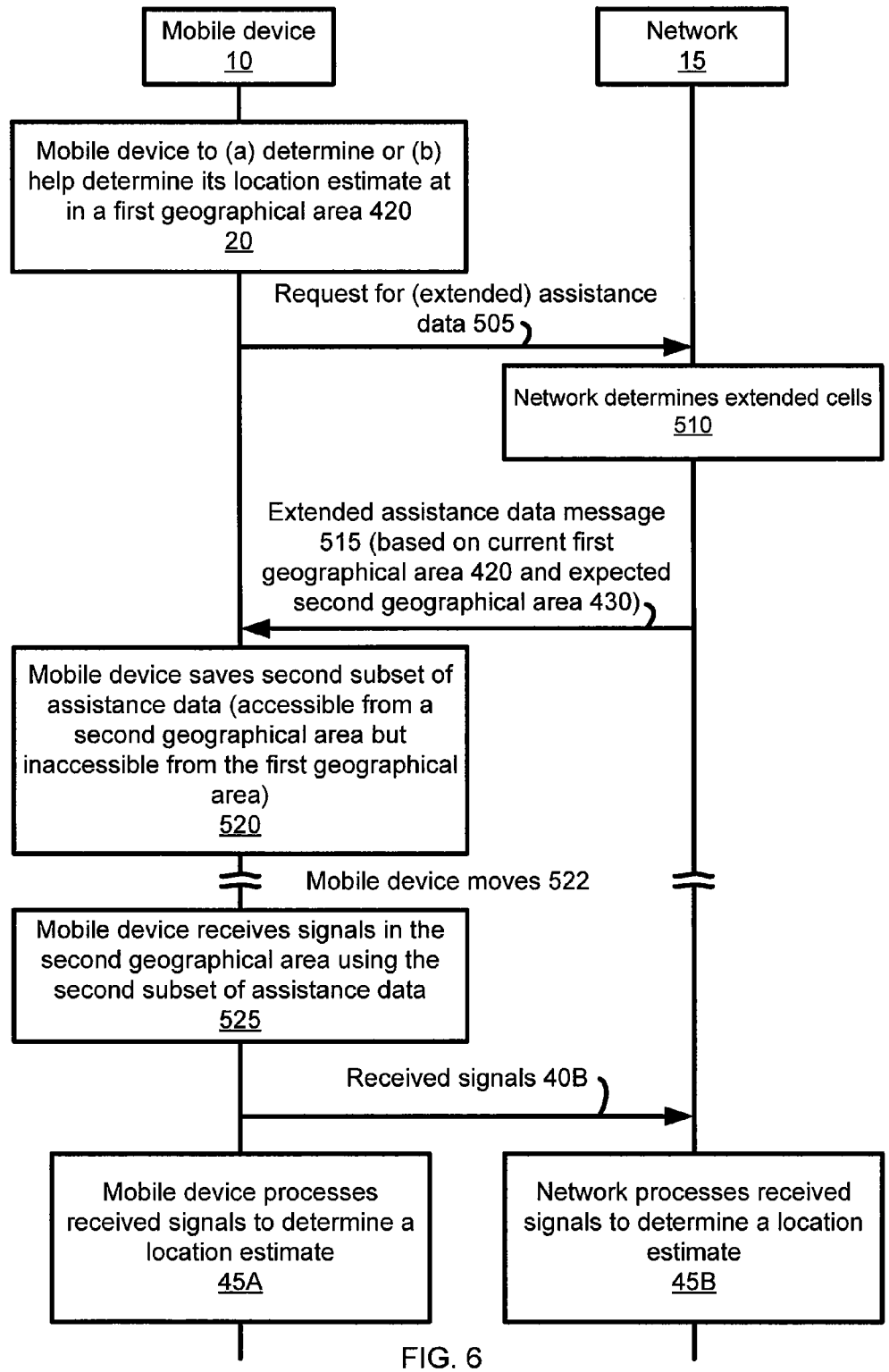
FIG. 6 shows show communication between a mobile device and a network to receive assistance data at a first geographical area and determine a location estimate at a second geographical area based on assistance data received at the first geographical area.

FIG. 6 shows show communication between a mobile device 10 and a network 15 to receive extended assistance data 200 at a first geographical area 420 and determine a location estimate at a second geographical area 430 based on the extended assistance data 200 received at the first geographical area 420. At 20, the mobile device 10 initiates a process within the mobile device 10 to determine, or help determine, its location estimate when the mobile device 10 is within a first geographical area 420. This process may be initiated in response to an action as enumerated above.

The mobile device 10 sends an assistance data request 505, which may be simply a request for assistance data or may be an explicit request for assistance data 200. That is, this assistance data request 505 may be for assistance data 100, in general, for the first geographical area 420, or a specific request for extended assistance data 200. The assistance data request 505 may be triggered by any of a variety of conditions. For example, the assistance data request 505 may be triggered by: (a) detection by the mobile device 10 of signals (e.g., LTE PRS signals) from base stations 410 not included in the currently available assistance data; (b) low signal strength of signals received at the mobile device 10 in the currently available assistance data; (c) obtaining a location estimate for the mobile device 10 that is outside a certain boundary (e.g., the boundary may be specified by the network 15 as part of the assistance data, such as in the form of a geometric shape such as circle or polygon); (d) obtaining a location estimate for the mobile device 10 that is more than a certain predetermined distance away from the location of the mobile device 10 when assistance data was previously received (e.g., the predetermined distance may be specified by the network 15 as part of the assistance data); (e) a predetermined periodic request for assistance data; (0 obtaining a location estimate for the mobile device 10 with an estimated error exceeding a preconfigured value (such as a predetermined value provided in the assistance data); (g) a prior received assistance data being received before some predetermined time in the past, and hence being error prone, for example, due to timing drift of base station transmission; or (h) the mobile device 10 detecting changes to the information provided in a prior request for assistance data (e.g., a change to the estimated destination or trajectory of the mobile device 10).

The assistance data request 505 may include one or more of the following parameters: (a) a Boolean indicator requesting an extended set of assistance data; (b) the distance or time period over which the mobile device 10 desires the data to be valid; (c) the number of cells requested to be included in the assistance data; (d) an indicator (e.g., size limit) to inform the network 15 of the capability of the mobile device 10 to store and process the extended assistance data 200; and (e) an indicator of the mobile device 10 being indoors or outdoors (e.g., based on GNSS signal strength), to enable the network 15 to provide assistance data that is better suited to the environment (e.g., including Wi-Fi or access point assistance data for a mobile device 10 that is indoors).

The assistance data request 505 may also include routing information of the mobile device 10, such as one or more of the following parameters: (f) cell Ills of base stations 410 where the mobile device 10 requests assistance data to be applicable; (g) cell IDs of base stations 410 where the mobile device 10 has recently seen; (h) the route of the mobile device 10 (e.g., starting and ending points, destination, estimated trajectory, a projected route, a sequence of cell IDs, latitude/longitude points, a straight line trajectory, or a trajectory along commonly used route); (i) an indication from the mobile device 10 of a set of relative or absolute locations in a second geographical area 430; (j) an indication from the mobile device 10 of its velocity (e.g., using a list of time-stamped position measurements or base station signals received by the mobile device 10); (k) an indication from the mobile device 10 of its speed without a direction; and (l) an indication from the mobile device 10 of its direction without a speed.

In some embodiments, one or more of these parameters are sent by the mobile device 10 to the network 15 within the assistance data request 505. In some embodiments, one or more of these parameters (e.g., a route of the mobile device 10, or a capability of the mobile device 10 to store and process the extended assistance data 200) are sent prior to communicating the assistance data request 505. In some embodiments, one or more of these parameters is not communicated in a message (such as in the assistance data request 505) but is inferred or extracted by the network 15 from other information or data bases, such as subscription information of a user of the mobile device 10 or known capabilities of a mobile device 10.

At 510, the network 15 determines the composition of the extended assistance data 200 including a list of one or more base stations 410. The network 15 then sends and the mobile device 10 receives an extended assistance data message 515 containing the extended assistance data 200, which possibly includes a first subset 100 of assistance data based on the (current) first geographical area 420 and includes a second subset 110 of assistance data based on the (expected) second geographical area 430. The mobile device 10 may begin receiving signals in the first geographical area 420 using the first subset 100 of assistance data (as described in step 35 above).

At 520, the mobile device 10 saves the second subset 110 of assistance data (accessible for a second geographical area 430 but inaccessible from the first geographical area 420). At 522, this example indicates the mobile device 10 has moved from the first geographical area 420 to the second geographical area 430. Unlike the example of FIGS. 2 and 3, which requested new assistance data after moving (step 70), if a mobile device 10 has saved the second subset 110 of assistance data for a second geographical area 430 and later enters the second geographical area 430, the mobile device 10 does not need to re-request assistance data for the (new) second geographical area 430. At 525, the mobile device 10 receives signals in the second geographical area 430 using the second subset 110 of assistance data previously received in the extended assistance data message 515.

Again, the mobile device 10 or the network 15 may determine a location estimate of the mobile device 10. At 45A, the mobile device 10 determines its location. Alternatively, the mobile device 10 assists the network 15 by sending a message 40B and at 45B, the network 15 determines a location estimate of the mobile device 10 based on the received signals.

In some instances, the method exemplified in FIG. 6 may reduce signaling and battery consumption and also enable determination of a location estimate of the mobile device 10 in the second geographical area 430 where determination of a location estimate using the method exemplified by FIGS. 2 and 3 would otherwise fail. For example, the mobile device 10 moves from a first geographical area 420 to a second geographical area 430 and is not able to request assistance data from the network 15 while in the second geographical area 430. This lack of an ability to communicate in the second geographical area 430 may be because: (a) the mobile device 10 does not have a communication link to the network 15 in the second geographical area 430; (b) the mobile device 10 does not have subscription to communicate with the network 15 in the second geographical area 430; or (c) the network 15 does not support request and delivery of assistance data in the second geographical area 430. In these circumstances, the execution of steps 70 and 75 in FIG. 3 are not possible. Therefore, obtaining extended assistance data 200 for the second geographical area 430 while still in the first geographical area 420 (as described above with reference to steps 505, 510 and 515 of FIG. 6) avoids the limitations of the method described in FIGS. 2 and 3.

Figure 7:
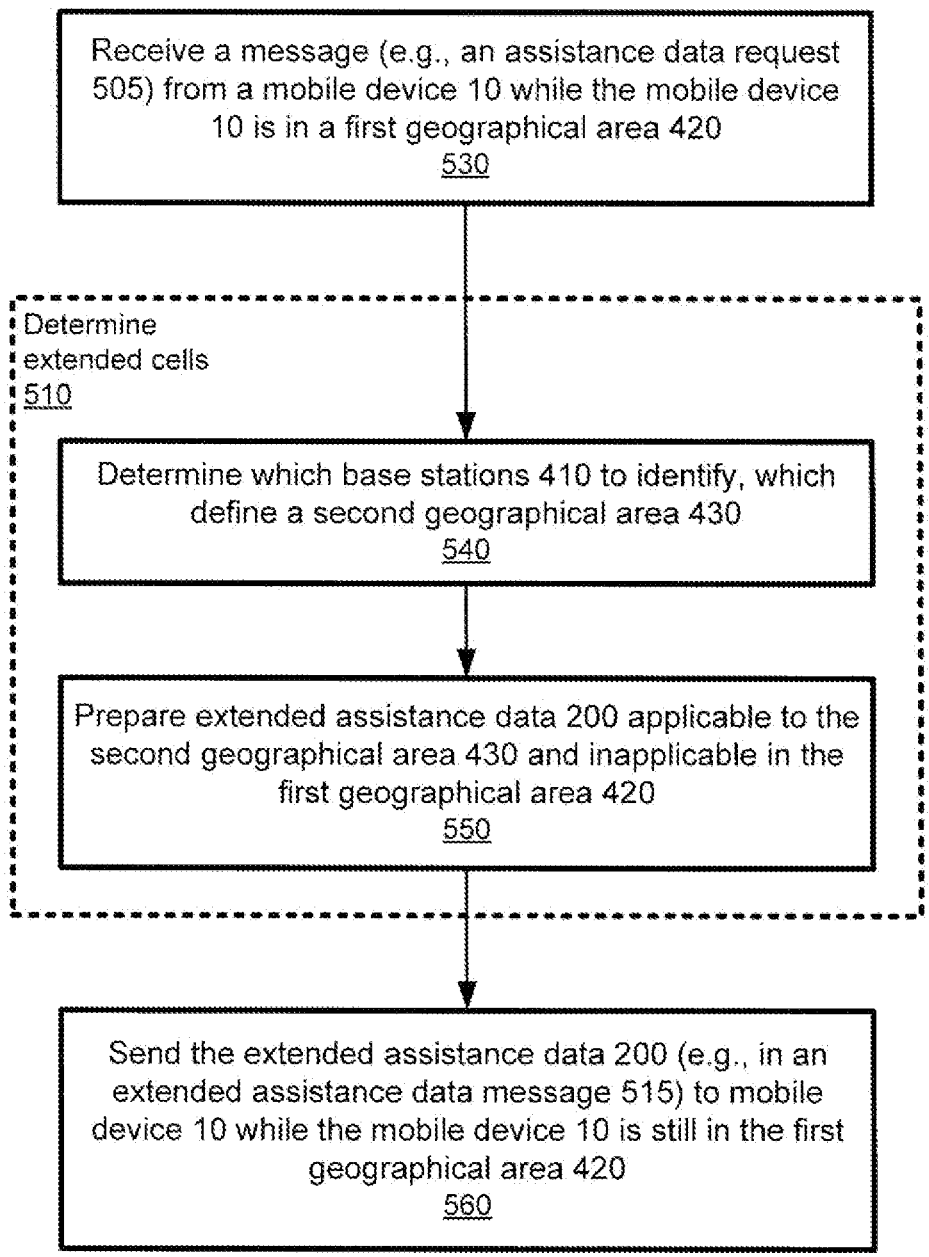
FIG. 7 shows a process within the network of determining extended assistance data.

FIG. 7 shows a process within the network 15 of determining extended assistance data 200. In some embodiments, a network entity, such as location server 460 (FIG. 1) determines the list of base stations 420 to include in the extended assistance data 200. This network entity may be a location server 460 (FIG. 1) by itself or a combination of a location server 460 and a base station almanac server 470 (FIG. 1).

At 530, the network entity receives a message (e.g., an assistance data request 505) from the mobile device 10 while the mobile device 10 is in a first geographical area 420.

Step 510 describes a process of determining the extended cells and includes steps 540 and 550. This list of transmitters may be based on the assistance data request 505 or developed internally by the network 15. That is, this process may be triggered by receiving the message at 530 or alternatively may be triggered internally to the network 15.

When triggered by the network 15, the network 15 decides to send the extended assistance data 200 based on one or more of the following network-determined parameters: (a) one or more of the indications received from and/or inferred for the mobile device 10; (b) the number of positioning transactions during a past period exceeding a preconfigured threshold (e.g., the network 15 determines the mobile device 10 is performing the position location function frequently enough that a single large download of extended assistance data 200 is preferable to frequent smaller downloads); (c) a sequence of prior location estimates made by the network 15 (the network 15 infers how far and/or into what cells the mobile device 10 is likely to move within the lifetime of the assistance data), including the network's maintaining a database of likely trajectories taken by the mobile device 10 or by a group of mobile devices in general; (d) deployment information provided as part of the network configuration (e.g., for cells along a highway, a network 15 may assume mobile devices 10 will mainly travel along the highway in one direction or the other rather than transversely to the highway); and (e) a profile of the mobile device 10 (e.g., the mobile device's interest in position tracking over a period of time). As a result, the second subset 110 of assistance data may be compiled based on one or more parameters in the assistance data request 505 received by the network 15 from the mobile device 10 and/or based on one or more network-determined parameters.

At 540, the network 15 determines what transmitters to identify in the extended assistance data 200. This list of base stations 410 will form the second subset 110 and will define the second geographical area 430.

At 550, the network 15 prepares the extended assistance data 200, which is applicable to the second geographical area 430 and inapplicable in the first geographical area 420.

At 560, the network 15 sends the extended assistance data 200 (e.g., an extended assistance data message 515), which includes the second subset 110, to mobile device 10 while the mobile device 10 is still in the first geographical area 420. The mobile device 10 is not able to use the second subset 110 of data until it moves from the first geographical area 420 to the second geographical area 430.

Figure 8:
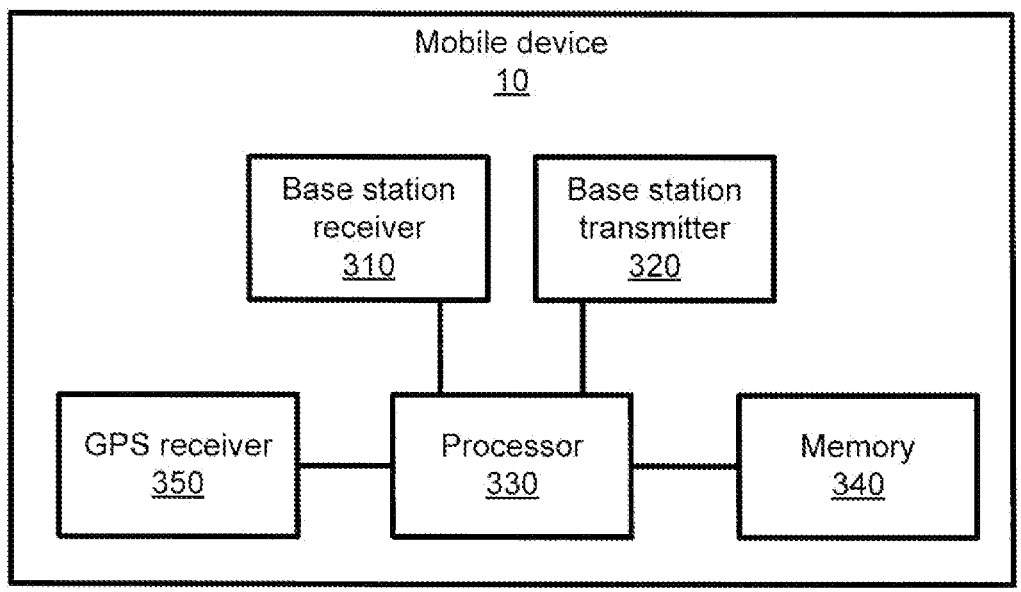
FIG. 8 shows a mobile device.

FIG. 8 shows a mobile device 10. The mobile device 10 includes a base station receiver 310, a base station transmitter 320, a processor 330 and memory 340. The mobile device 10 may also include an SPS receiver, such as a GPS receiver 350. The base station receiver 310 and the base station transmitter 320 communicate with a transceiver of a base station $_{410}$. The base station receiver 310 receives and processes base station signals, which are processed either by the processor 330 or, if assisted GPS is employed, by the network 15. The GPS receiver 350 processes GPS signals, which are generated from GPS satellites. Some base stations 410, such as a cellular base station, provide cellular base station signals over a cellular base station communication link. Other base stations 410, such as a wireless LAN access point (AP), provide access point base station signals over an access point communication link. The base station receiver 310 and base station transmitter 320 may share one or more antennas or may each have one or more separate unshared antennas. Similarly, the GPS receiver 350 may have a separate antenna or may share an antenna with the base station receiver 310. The base station receiver 310 and base station transmitter 320 may use separate and distinct components for at least partial processing of signals and may or may not share some other components. The base station receiver 310 and base station transmitter 320 may support multiple base station communication technologies and/or protocols and/or different wireless networks. The base station receiver 310 and base station transmitter 320 may have separate and/or shared circuits for RF signal processing. The base station receiver 310 and base station transmitter 320 may be implemented in a single communication transceiver or may be implemented as multiple receivers and transmitters for different wireless networks.

For example, the base station receiver 310 and base station transmitter 320 may include a transceiver portion for receiving and/or transmitting cellular telephone signals and another transceiver portion for receiving and/or transmitting Wi-Fi or access point signals. The GPS receiver 350 includes a GPS acquisition and tracking circuit, which is coupled to a GPS antenna. GPS signals (e.g., from GPS satellites) are received through an antenna and input to the GPS receiver 350, which acquires the PN (pseudorandom noise) codes for various GPS satellites. The data produced by the GPS receiver 350 (e.g., correlation indicators) may be processed within the GPS receiver 350 or by the processor 330. In some embodiments of the present invention, the base station receiver 310 and base station transmitter 320 are capable of being used with a single air interface (e.g., IEEE 802.11, Bluetooth, UWB, TD-SCDMA, iDEN, HDR, TDMA, GSM, CDMA, W-CDMA, UMTS or other similar networks) for communication to a base station 410, such as a cellular base station and/or an access point. In other embodiments, the base station receiver 310 and base station transmitter 320 are capable of being used with two or more of these interfaces.

The memory 340, which may be integrated with and/or separate from the processor 330, may contain code to perform the methods described herein. The memory 340 may be one or a combination of computer-readable media including RAM, ROM. EEPROM, CD-ROM, DVD-ROM or other optical disk storage, magnetic disk storage, another magnetic storage device, and the like. For example, the memory 340 may include a computer-readable storage medium comprising program code stored thereon for a processor 330 of a mobile device 10 to: receive extended assistance data 200 within a first geographical area 420, wherein the extended assistance data 200 comprises assistance data accessible from a second geographical area 430 but inaccessible from the first geographical area 420 (described herein as a second subset 110 of assistance data); save the extended assistance data 200; and obtain location information after moving to the second geographical area 430 using the extended assistance data 200.

FIG. 9 shows extended assistance data 200 contained in an assistance data message 515. The extended assistance data 200 includes a first subset 100 of assistance data accessible from a (current) first geographical area 420 and a second subset 110 of assistance data accessible from a (next) second geographical area 430. The second subset 110 of assistance data is accessible from the second geographical area 430 but inaccessible from the first geographical area 420. The mobile device 10 receives the second subset 110 of assistance data while in the first geographical area 420, therefore, the second subset 110 of assistance data is immediately unusable.

Each subset may include a base station almanac. A base station almanac 105 for the first geographical area 420 may include a listing of base stations 410 in the first geographical area 420. A base station almanac 115 for the second geographical area 430 may include a listing of base stations 410 in the second geographical area 430. The two base station almanacs may be mutually exclusive or partially overlapping. For each base station 410 listed, the base station almanac 105, 115 may include one or more identifying parameters, including: (a) a type of base station node (e.g., CDMA2000, node B (UMTS), eNode B (LTE) or Access Points (Wi-Fi)); (b) a node ID; (c) a longitude of node; (d) a latitude of node; (e)

transmission timing of the node (e.g., relative to one or more neighboring base stations 410); (f) transmission power of the node; and (g) a GPS or GNSS timing relationship to base station transmission timing.

The extended assistance data 200 may also include GPS or GNSS assistance data 120. In each case, the extended assistance data 200 includes the second subset 110 of assistance data, however, the first subset 100 of assistance data and GNSS assistance data 120 may or may not be part of the extended assistance data 200. For example, in some embodiments, the extended assistance data 200 includes the second subset 110 of assistance data but not the first subset 100 of assistance data. In other embodiments, the extended assistance data 200 includes both the first subset 100 of assistance data and the second subset 110 of assistance data but not the GNSS assistance data 120.

Figure 10:
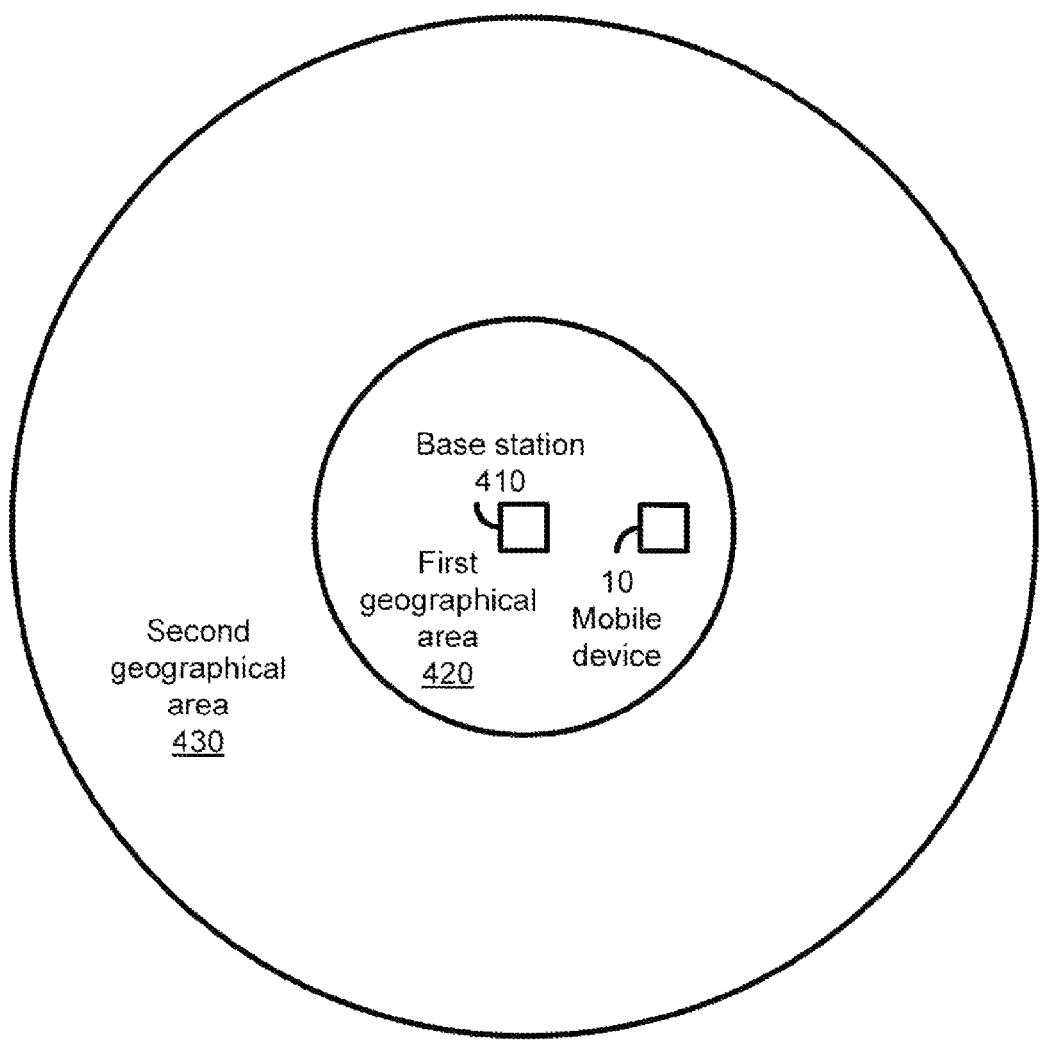
FIGS. 10 and 11 show a current first geographical area containing a mobile device and a predicted second geographical area containing cells currently out of view by the mobile device.
Figure 11:
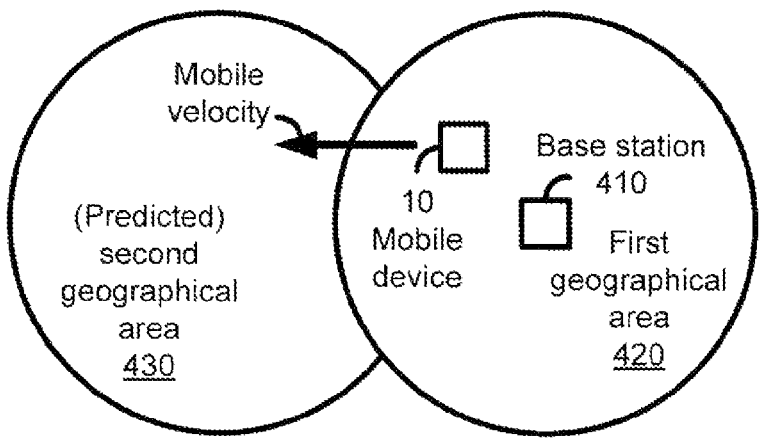

FIGS. 10 and 11 show a (current) first geographical area 420 containing a mobile device 10 and a (predicted) second geographical area 430 containing cells currently out of view by the mobile device 10.

In FIG. 10, a base station 410 serving a mobile device 10 provides a coverage area. In this case, the coverage area defines the first geographical area 420. In other cases, multiple base stations 410 grouped together provide a coverage, which is used to define the first geographical area 420. A second geographical area 430 is shown as an annular-shaped area beginning at the edge of the first geographical area 420 and continuing to a radius from the base station 410. The second geographical area 430 may be defined by the coverage area of neighbors to the one or more base stations 410 within the first geographical area 420. Such an annular model may be used if a route of the mobile device 10 is unknown. For example, if the mobile device 10 is stationary or indicating no recent movement, the second geographical area 430 may be generally defined without predicting a particular direction of the mobile device 10.

In FIG. 11, a mobile velocity is known, estimated or predicted. As shown above, a base station 410 or group of base stations 410 define a first geographical area 420. A second geographical area 430 may be limited to base stations 410 within the path of the mobile velocity. By using a mobile velocity, the second geographical area 430 may be comparable in size when compared to the first geographical area 420.

Other models may be used to set the second geographical area 430 based on past and current movement of the mobile device 10. Alternatively, the second geographical area 430 may be set based on a destination, route or direction explicitly communicated from the mobile device 10 to the network 15 or inferred by the network 15 based on other information received from the mobile device 10 such as a request for navigation or map information. As explained above, the second geographical area 430 is used to set a list of base stations 410 listed within the base station almanac of the second subset 110 of assistance data communicated from the network 15 to the mobile device 10 in an extended assistance data 200.

The methodologies described herein may be implemented by various means depending upon the application. For example, these methodologies may be implemented in hardware, firmware, software, or any combination thereof. For a hardware implementation, the processors/processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

For an implementation involving firmware and/or software, the functions may be stored as one or more instructions or code on a computer-readable medium. Examples include computer-readable media encoded with a data structure and computer-readable media encoded with a computer program. Computer-readable medium may take the form of an article of manufacture. Computer-readable medium includes physical computer storage medium. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method for determining a location estimate of a mobile device, the method comprising:
    receiving extended assistance data, while in a first geographical area, wherein the extended assistance data comprises assistance data applicable in a second geographical area and inapplicable in the first geographical area;
    saving the extended assistance data to memory;

obtaining location information, while in the second geographical area, using the assistance data applicable in the second geographical area; and providing the location information to determine the location estimate of the mobile device.

2. The method of claim 1, wherein the second geographical area is based on a prediction of a future location of the mobile device.

3. The method of claim 1, wherein the second geographical area is based on a sequence of past locations.

4. The method of claim 1, wherein the second geographical area is based on an estimated trajectory of the mobile device.

5. The method of claim 1, wherein the second geographical area is based on a route of the mobile device.

6. The method of claim 1, wherein the second geographical area is based on a destination of the mobile device.

7. The method of claim 1, wherein the second geographical area is based on a network configuration.

8. The method of claim 1, further comprising requesting assistance data from the network.

9. The method of claim 8, wherein the act of requesting assistance data from the network comprises providing, from the mobile device to the network, routing information of the mobile device.

10. The method of claim 1, wherein the extended assistance data further comprises assistance data applicable in the first geographical area.

11. The method of claim 10, further comprising obtaining location information in the first geographical area using the assistance data applicable in the first geographical area.

12. The method of claim 10, further comprising receiving a plurality of signals using the extended assistance data for estimating the location estimate within the first geographical area.

13. The method of claim 1, further comprising receiving a plurality of signals using the extended assistance data for estimating the location estimate within the second geographical area.

14. The method of claim 1, wherein providing the location information comprises determining, by the mobile device, the location estimate in the second geographical area.

15. The method of claim 1, wherein providing the location information comprises assisting a network to determine the location estimate by sending the location information to the network.

16. The method of claim 1, wherein the location information comprises signal measurements from the second geographical area.

17. The method of claim 16, further comprising transmitting the signal measurements to a network for determining a location estimate in the second geographical area.

18. A mobile device for determining a location estimate of the mobile device, the mobile device comprising a base station receiver, a base station transmitter, a processor and memory comprising code to:
receive extended assistance data, while in a first geographical area, wherein the extended assistance data comprises assistance data applicable in a second geographical area and inapplicable in the first geographical area;
save the extended assistance data to memory;
obtain location information, while in the second geographical area, using the assistance data applicable in the second geographical area; and
provide the location information to determine the location estimate of the mobile device.

19. The mobile device of claim 18, wherein the second geographical area is based on at least one of:
a prediction of a future location of the mobile device;
a sequence of past locations;
an estimated trajectory of the mobile device;
a route of the mobile device; and
a destination of the mobile device.

20. The mobile device of claim 18, wherein the extended assistance data further comprises assistance data applicable in the first geographical area.

21. The mobile device of claim 18, further comprising code to receive a plurality of signals using the extended assistance data for estimating the location estimate within the second geographical area.

22. The mobile device of claim 18, wherein the code to provide the location information comprises code to determine, by the mobile device, the location estimate in the second geographical area.

23. The mobile device of claim 18, wherein the code to provide the location information comprises code to assist a network to determine the location estimate by sending the location information to the network.

24. A mobile device for determining a location estimate of the mobile device, the mobile device comprising:
means for receiving extended assistance data, while in a first geographical area, wherein the extended assistance data comprises assistance data applicable in a second geographical area and inapplicable in the first geographical area;
means for saving the extended assistance data to memory;
means for obtaining location information, while in the second geographical area, using the assistance data applicable in the second geographical area; and
means for providing the location information to determine the location estimate of the mobile device.

25. A mobile device for determining a location estimate of the mobile device, the mobile device comprising a processor and memory comprising instructions to:
receive extended assistance data, while in a first geographical area, wherein the extended assistance data comprises assistance data applicable in a second geographical area and inapplicable in the first geographical area;
save the extended assistance data to memory;
obtain location information, while in the second geographical area, using the assistance data applicable in the second geographical area; and
provide the location information to determine the location estimate of the mobile device.

26. A non-transitory computer-readable storage medium comprising program code stored thereon for a mobile device for determining a location estimate of the mobile device, the program code including code to:
receive extended assistance data, while in a first geographical area, wherein the extended assistance data comprises assistance data applicable in a second geographical area and inapplicable in the first geographical area;
save the extended assistance data to memory;
obtain location information, while in the second geographical area, using the assistance data applicable in the second geographical area; and
provide the location information to determine the location estimate of the mobile device.

27. A method of preparing extended assistance data, by a network, for a mobile device in a first geographical area, the method comprising:
determining base stations to identify thereby defining a second geographical area;
preparing the extended assistance data, wherein the extended assistance data comprises assistance data applicable in the second geographical area and known inapplicable in the first geographical area; and sending the extended assistance data to the mobile device while the mobile device is in the first geographical area.

28. The method of claim 27, further comprising receiving an assistance data request from the mobile device in the first geographical area.

29. The method of claim 28, wherein the act of determining the base stations to identify is triggered by the act of receiving the assistance data request from the mobile device in the first geographical area.

30. The method of claim 27, wherein the act of determining the base stations to identify comprises triggering, by the network, the act determining the base stations.

31. The method of claim 30, wherein the act of triggering is based on at least one network parameter.

32. The method of claim 31, wherein the at least one network parameter is based on at least one of:
    (a) a parameter received from the mobile device;
    (b) a number of position transactions occurring during a past period;
    (c) a sequence of prior location estimates made by the network;
    (d) deployment information provided as part of network configuration; and
    (e) a profile of the mobile device.

33. A network entity for preparing extended assistance data for a mobile device in a first geographical area, the network entity comprising:
    means for determining base stations to identify thereby defining a second geographical area;
    means for preparing the extended assistance data, wherein the extended assistance data comprises assistance data applicable in the second geographical area and known inapplicable in the first geographical area; and
    means for sending the extended assistance data to the mobile device while the mobile device is in the first geographical area.

34. A network entity for preparing extended assistance data for a mobile device in a first geographical area, the network entity comprising a processor and memory comprising code to:
    determine base stations to identify, for the mobile device in a first geographical area, thereby defining a second geographical area;
    prepare the extended assistance data, wherein the extended assistance data comprises assistance data applicable in the second geographical area and known inapplicable in the first geographical area; and
    send the extended assistance data to the mobile device while the mobile device is in the first geographical area.

35. A non-transitory computer-readable storage medium comprising program code stored thereon for a network entity for determining a location estimate of a mobile device, the program code including code to:
    determine base stations to identify, for the mobile device in a first geographical area, thereby defining a second geographical area;
    prepare the extended assistance data, wherein the extended assistance data comprises assistance data applicable in the second geographical area and known inapplicable in the first geographical area; and
    send the extended assistance data to the mobile device while the mobile device is in the first geographical area.

36. The method of claim 1, wherein the extended assistance data includes at least one of satellite assistance data or terrestrial assistance data.

* * * * *